Fig. 5

Nov. 10, 1953          S. A. SCHERBATSKOY          2,659,014
RADIOACTIVITY WELL LOGGING SYSTEM
Filed July 5, 1951                                6 Sheets-Sheet 6

INVENTOR.
Serge A. Scherbatskoy

Patented Nov. 10, 1953

2,659,014

UNITED STATES PATENT OFFICE 2,659,014

RADIOACTIVITY WELL LOGGING SYSTEM

Serge A. Scherbatskoy, Tulsa, Okla., assignor to Perforating Guns Atlas Corporation, Houston, Tex., a corporation of Delaware Application July 5, 1951, Serial No. 235,300

21 Claims. (Cl. 250—83.6)

The present invention relates to radioactivity well logging systems, and more particularly, to a radioactivity well logging system for simultaneously obtaining a neutron log and a gamma ray log of a borehole. Specifically, the present invention relates to an improvement of the radioactivity well logging system described in my United States Patent No. 2,349,225 which issued on May 16, 1944.

The radioactivity well logging system discussed in my prior patent identified above, is designed to produce at the earth's surface a permanent record of one type of radioactivity encountered by a subsurface exploratory unit which may be lowered into the borehole. Essentially, this well logging system comprises a follow-up, or servo system which is used to measure at the earth's surface the output of a radiation detector positioned within the subsurface exploratory unit which latter unit is preferably supported by a single conductor cable. Measurement of the radiation detector output is accomplished by transmitting an alternating current signal representative of the detector output to the earth's surface together with a reference signal of fixed phase, adjusting the arm of a slide wire potentiometer at the earth's surface in accordance with the alternating current signal and feeding back a unidirectional signal to the subsurface unit which is proportional to the position of the arm of the potentiometer to balance or match the detector output thereby bringing the system to a null or balance point. As the detector output varies the system follows by readjusting the arm of the potentiometer by the proper amount and in the proper direction to cause the feedback potential to exactly equal the detector output and rebalance the system. The position of the arm of the potentiometer is thus an accurate indication of the detector output and may be used to produce a permanent record of the radioactivity encountered by the subsurface unit.

While the above described well logging system is satisfactory for obtaining a log of one type of radiation, and, in fact, is highly desirable from the standpoint of accuracy, it is in many instances necessary to combine two types of radioactivity logs. For example, it is necessary to combine a gamma ray log and a neutron log in order that the stratigraphy and possible pay zones may be accurately correlated. In such situations, it is extremely desirable to produce both logs simultaneously so that correlated gamma ray and neutron information is obtained in a single operation.

In addition to the production of gamma ray and neutron logs, it is also necessary to obtain accurate depth measurements, both for the purpose of correlating the two logs and for the purpose of checking previous depth measurements. Of the conventional depth measurement methods available, the collar logging method is generally considered the most accurate; such devices as the depth measuring sheave, etc., being inaccurate due to stretching of the supporting cable as an apparatus is lowered into the borehole. It would be desirable, therefore, to provide facilities for obtaining a simultaneous neutron and gamma ray log together with a collar position log, while employing a high accuracy follow-up system such as described above for each of the radioactivity logs. Furthermore, it is desirable to provide the above described simultaneous well logging system while employing only a single conductor armored cable to raise and lower the equipment, to supply power to the subsurface unit and to transmit all of the logging signals between the subsurface equipment and the surface equipment. Such a cable is easy to handle, is inexpensive, and may be constructed to withstand the weight of many thousands of feet of its own length.

Accordingly, it is an object of the present invention to provide a new and improved radioactivity well logging system for simultaneously producing a neutron log and a gamma ray log of a borehole.

It is another object of the present invention to provide a new and improved well logging system for simultaneously producing a combined neutron and gamma ray log wherein each of the logs is obtained by means of a self-balancing follow-up system and all of the signals of the system are transmitted to the earth's surface over a single cable, preferably comprising a single insulated conductor.

It is a further object of the present invention to provide a new and improved well logging system for simultaneously producing a combined neutron, gamma ray and collar position log, wherein each of the radioactivity logs is obtained by means of a self-balancing follow-up system and all of the logging signals are transmitted to the earth's surface over a single cable preferably comprising a single insulated conductor.

It is a still further object of the present invention to provide a new and improved well logging system for simultaneously obtaining a combined neutron and gamma ray log wherein each of the logs is obtained by means of a self-balancing slide wire potentiometer system, and wherein all of the signals of both systems are transmitted to the earth's surface by a single cable, preferably comprising a single insulated conductor, and wherein the single conductor cable is also used to supply power to the subsurface equipment and to transmit collar position information to the earth's surface.

Briefly, according to one phase of the invention, the subsurface exploratory unit is provided with first and second ionization chambers adapted respectively to produce unidirectional ionization currents proportional to gamma rays intercepted by the unit and neutrons intercepted by the unit. The gamma ray channel is substantially as described in my prior patent described above and includes facilities for transmitting an alternating current proportional to the gamma ray detector output and a fixed phase reference signal which is modulated on a higher frequency carrier over the supporting cable to the earth's surface and for feeding back a unidirectional balancing potential over the cable to the subsurface unit to bring the system to a null or balance point. The neutron channel includes facilities for transmitting an alternating current of a different frequency from that of the gamma ray signal and representative of the neutron detector output and a fixed phase reference signal modulated on a carrier wave of different frequency from that of the gamma ray carrier over the supporting cable to the earth's surface. The feedback signal for the neutron channel may be transmitted back over the supporting cable in one of two ways. In the first embodiment the neutron feedback signal comprises a pulse wave having an amplitude and polarity representative of the position of the arm of the neutron slide wire potentiometer. In the second embodiment the neutron feedback signal comprises a first alternating current of a frequency different from the remaining signals of the system and a fixed phase reference signal which is modulated on a carrier wave of still another frequency. As either the gamma ray and neutron ionization current changes, the corresponding slide wire potentiometer at the earth's surface is readjusted so as to bring the channel associated therewith to a null or balance point.

In accordance with another aspect of the invention, a simplified system is provided in which the use of feedback signals is eliminated. In accordance with a further aspect of the invention, collar position information is also transmitted over the supporting cable in the form of unidirectional voltage fluctuations or kicks which are detected at the earth's surface to provide a combined gamma ray, neutron and collar position log.

The invention, both as to its organization and method of operation, together with further objects and advantages thereof, will best be understood by reference to the following specification taken in connection with the accompanying drawings in which.

Figure 1:
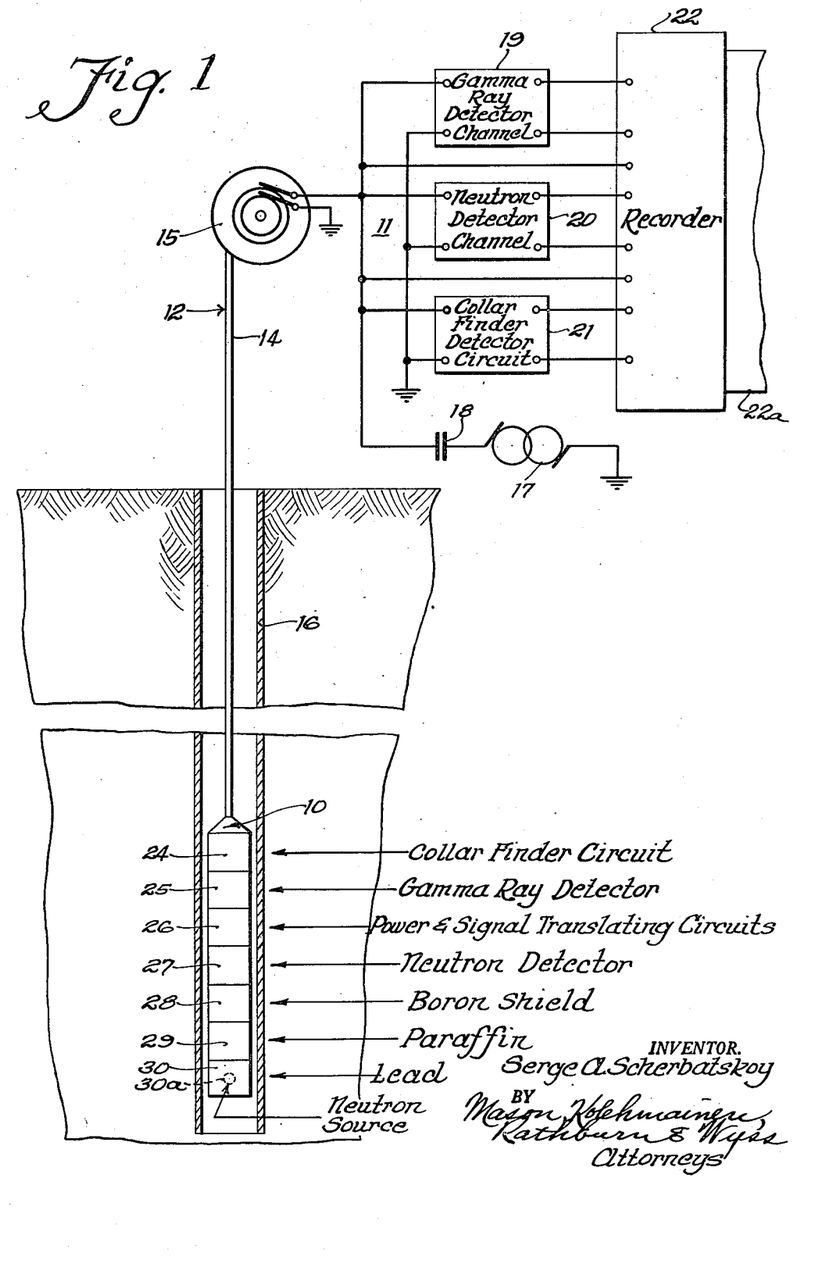
Fig. 1 diagrammatically illustrates a simultaneous radioactivity well logging system characterized by the features of the present invention.

Referring now to the drawings and more particularly to Fig. 1 thereof, the simultaneous neutron, gamma ray and collar position logging apparatus there illustrated generally comprises a subsurface unit 10 and a surface unit 11 interconnected by means of a single conductor coaxial cable 12. The arrangement illustrated is particularly adapted for the simultaneous production of high accuracy neutron and gamma ray logs of boreholes traversed by the subsurface unit 10.

In general, the subsurface equipment 10 comprises a collar finder circuit 24, a gamma ray detector 25, power and signal translating circuits 26, a neutron detector 27, a boron shield 28, a paraffin spacer 29 and a mass of lead 30 within which is positioned a suitable neutron source 30a.

The component units 24 to 30, inclusive, are all housed within a sealed housing having the requisite physical strength to withstand the fluid pressures encountered and are preferably located in the housing in the particular order illustrated. The unit 10 is arranged to be lowered into the borehole by means of the cable 12 which preferably is of the coaxial type and comprises a center conductor 13 surrounded by and insulated from an armored sheath 14. This sheath is appropriately grounded at the earth's surface and an alternating current generator 17, forming a part of the surface equipment 11 and coupled to the cable conductor 13 through the blocking condenser 18, is utilized to supply power over the cable 12 to the subsurface unit 10. As will be understood by those skilled in the art, the cable 12 extends into the borehole and is carried on a suitable power operated drum 15 located at the earth's surface. Conventional drive facilities may be provided for rotating the drum 15 in either direction, whereby the cable 12 may be fed into or reeled out of the borehole so as to move the subsurface equipment 10 longitudinally of the borehole. In the particular arrangement illustrated in Fig. 1, the bore hole is lined with the usual ferrous metal casing 16 which is provided with collar coupling elements, not shown, along the length thereof. These elements have the effect of increasing the wall thickness of the casing at evenly spaced points along the length of the casing and hence serve as casing section markers.

Generally considered, the surface equipment 11 comprises a gamma ray detector channel 19, a neutron detector channel 20, a collar finder detector circuit 21 and a recorder 22 which is preferably of the commercial type known as the Speed-O-Max manufactured by the Leeds & Northrup Co. of Philadelphia, Pa. Specifically, the output circuits of the units 19 and 20 are connected to the recording instrument 22 which operates to produce on the record strip 22a, a continuous graph of both the neutron and gamma ray signals transmitted to the surface equipment 11 from the subsurface equipment 10. The recorder 22 also responds to signals from the detector circuit 21 to produce record indications on the strip 22a identifying the positions of the casing collars so that a correlated neutron, gamma ray and depth measurement log is obtained.

Briefly to consider the general mode of operation of the simultaneous loggings system shown in Fig. 1 without considering in detail the circuit arrangements of the units shown therein in block diagram form, the gamma ray detector 25 intercepts and detects gamma radiation emanating from the subsurface material surrounding the borehole. Preferably, the gamma ray detector 25 is in the form of an ionization chamber which conventionally consists of a cylinder containing two insulated electrodes and filled with an inert gas under high pressure. Under normal conditions, the high insulating properties of the gas keep any current from flowing when an electrical potential is applied between the electrodes. However, when the chamber is subjected to gamma radiation, the action of the gamma rays on the molecules of the gas is such as to cause partial ionization, an electrical phenomenon which results in a small electrical current flowing between the electrodes. The magnitude of this current is proportional to the intensity of the gamma rays entering the chamber.

The unidirectional ionization current produced by the gamma ray ionization chamber 25 is measured by means of a null balance or follow-up system which includes a self-balancing potentiometer of the inverter type. More specifically, the voltage difference between the output of the ionization chamber 25 and the voltage which exists across a feedback circuit load impedance in the subsurface unit 10 is derived and is converted into a 75 cycle per second signal, which may be termed an alternating current error signal and which is transmitted to the surface over the single conductor of the cable 12. A 75 cycle alternating current reference signal of fixed phase position is also produced in the subsurface unit 10 and is modulated upon a 570 cycle carrier wave, the modulated carrier wave also being transmitted to the earth's surface over the single conductor of the cable 12. The 75 cycle reference signal is demodulated in the gamma ray detector channel 19 and is compared with the 75 cycle error signal in a ring modulator circuit so as to provide a unidirectional gamma ray error signal indicative of the unbalance of the system. The unidirectional gamma ray error signal is supplied to the recorder 22 wherein it is used to actuate the arm of a balanced slide wire potentiometer, and to control the position of a recording pen. A source of unidirectional potential is connected across the gamma ray slide wire potentiometer and the potential at the arm of the potentiometer is fed back over the single conductor of the cable 12 to the feedback load impedance to balance or match the gamma ray ionization chamber output and hence bring the system to a balance or null point. As the gamma ray ionization current varies, an alternating current error signal is transmitted to the surface in the manner described above and functions to adjust the position of the slide wire potentiometer arm which in turn changes the unidirectional feedback voltage in the proper direction to reduce the error signal to zero and thus balance the system.

The neutron detector 27 functions to detect neutrons which are induced in the surrounding formation and returned to the detector in response to irradiation of the formation by the neutrons emitted from the source 30a. In order to improve the quality of the neutron log, the paraffin spacer 29 and the boron shield 28 are provided with are positioned between the source 30a and the neutron detector 27. The details of the paraffin-boron shield between the neutron source and the neutron detector are described in detail in my copending application Serial No. 205,616, filed January 12, 1951. However, for purposes of the present disclosure, it may be stated that the paraffin and boron shield is provided to prevent the direct transmission of neutrons from the source 30a to the neutron detector 27 so that the neutrons from the source 30a must travel through the surrounding formation and enter the neutron detector 27 in a direction at least partially lateral to the axis of the borehole.

The neutron detector 27 is preferably of the ionization chamber type and is substantially identical to the gamma ray detector 25. However, in order to detect neutrons which travel from the source 30a through the surrounding formation to the detector 27, this detector is encased in or coated with a composition of materials consisting of or comprising elements, such as cadmium, which have the property of absorbing neutrons, particularly neutrons whose velocity has been reduced by passage through a medium comprising low atomic weight elements such as hydrogen, and of emitting so-called gamma rays of capture in proportion to the absorption of neutrons thereby, as will be readily understood by those skilled in the art.

The unidirectional ionization current of the detector 27 is measured by means of a null balance system of the same general character as that described above in connection with the gamma ray detector channel. However, the alternating current error signal is of a different frequency, preferably 40 cycles, and the 40 cycle phase reference signal is modulated upon a carrier wave of different frequency, preferably a frequency of 250 cycles. In order to provide a simultaneous neutron and gamma ray logging system while utilizing the single conductor cable 12, it is necessary to provide different facilities for feeding back a signal to the subsurface unit 10 to balance the neutron null point system. This will be readily understood when it is realized that the gamma ray channel employs a unidirectional feedback potential and, if both systems were to feed back unidirectional potentials over the same conductor, the two unidirectional voltages would interfere with each other and cause improper operation of each channel.

In accordance with the present invention, simultaneous neutron and gamma ray logging is accomplished by modifying the feedback signal of either one of the channels, so that it will not interfere with the feedback signal of the other channel. Furthermore, alternative modifications of the feedback signal may be employed. In the illustrated embodiments of the invention, the neutron channel is modified and in the system of Figs. 2 and 3 one particular system is shown. In this embodiment a pulse type of feedback signal is employed. More specifically, a pulse generator is connected across the neutron slide wire potentiometer, the pulses therefrom having a time duration which is a small fraction of the recurrence rate thereof. Preferably, the frequency of the pulses is relatively high, being of the order of 1,000 to 2,000 cycles per second. The portion of the pulse generator output which appears between the arm of the neutron slide wire potentiometer and ground is fed back over the cable 12 to the subsurface unit 10 wherein the pulses are rectified to produce a unidirectional balancing potential which is supplied to the feedback load impedance to balance out the neutron detector output and thus balance the system.

Figure 4:
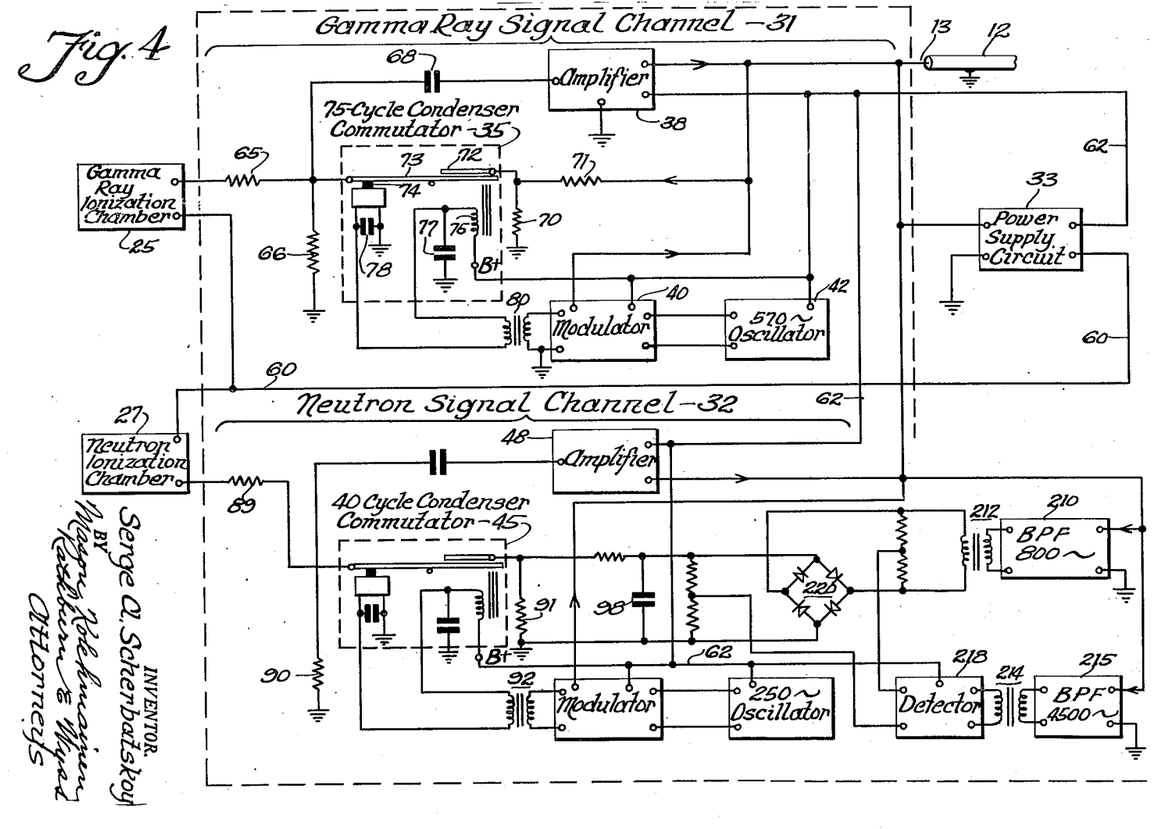
Figs. 4 and 5 are schematic diagrams of another embodiment of the subsurface and surface equipments, respectively, of the present improved logging apparatus.
Figure 5:
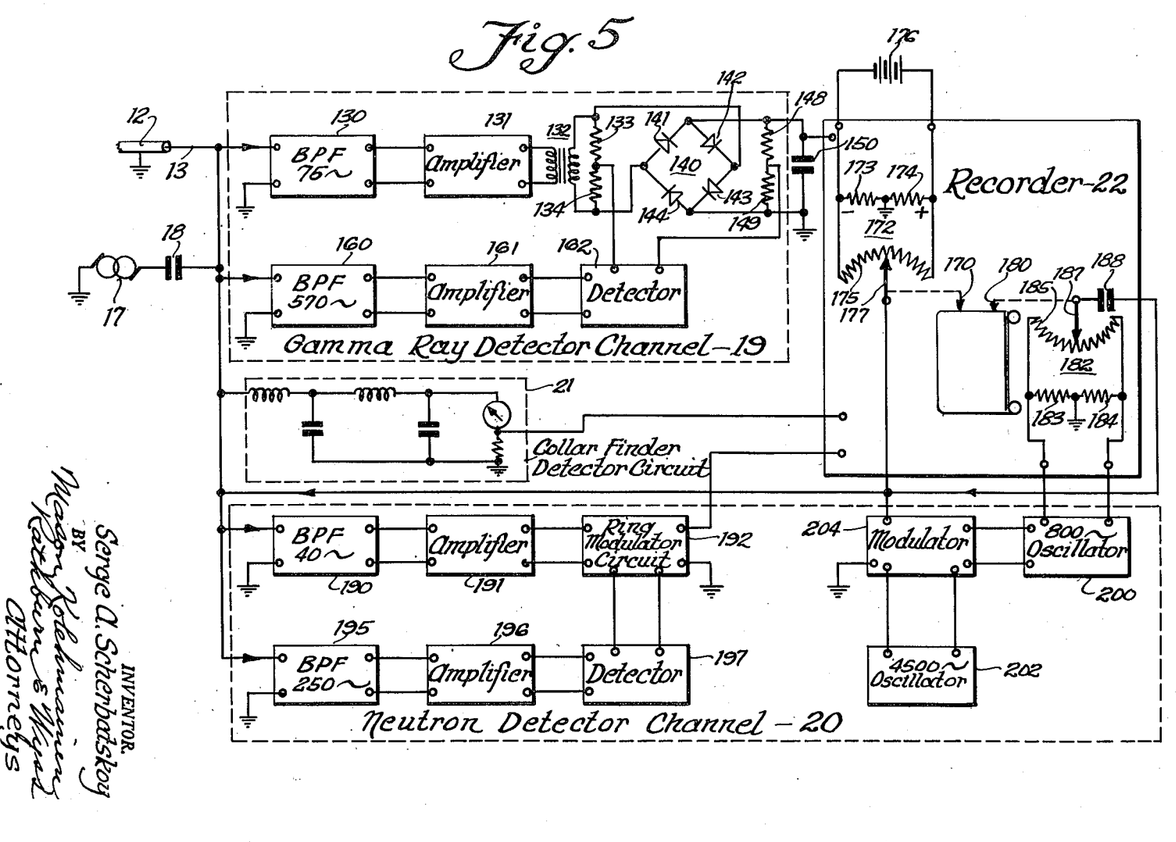

In the alternative system shown in Figs. 4 and 5, an 800 cycle sine wave generator is connected across the neutron slide wire potentiometer and the portion of the 800 cycle generator output which appears between the arm of the potentiometer and ground is fed back over the cable 12 to the subsurface unit 10. An 800 cycle fixed phase reference signal derived from the 800 cycle generator is modulated upon a carrier wave of relatively high frequency, preferably of the order of 4500 cycles per second, and the modulated carrier wave is also fed back over the cable 12 as a phase reference signal. In the unit 10, the two 800 cycle signals are compared in a ring modulator circuit to derive a unidirectional balancing potential which is applied to the neutron feedback load impedance to balance the neutron detector output and bring the neutron channel to a balanced or null condition.

In the subsurface unit 10, the collar finder circuit 24 functions to produce a unidirectional voltage deflection, or kick, each time the unit 10 traverses a casing collar and these voltage kicks are supplied over the conductor 13 to the surface equipment 11. The unidirectional voltage collar finder kicks are separated from the other signals present on the cable conductor 13 in the collar finder detector circuit 21 and are supplied to the recorder 22. There is thus produced simultaneously with the gamma ray and neutron logs on the record strip 22a a correlated collar position log so as to provide correlated depth measurement.

Figure 2:
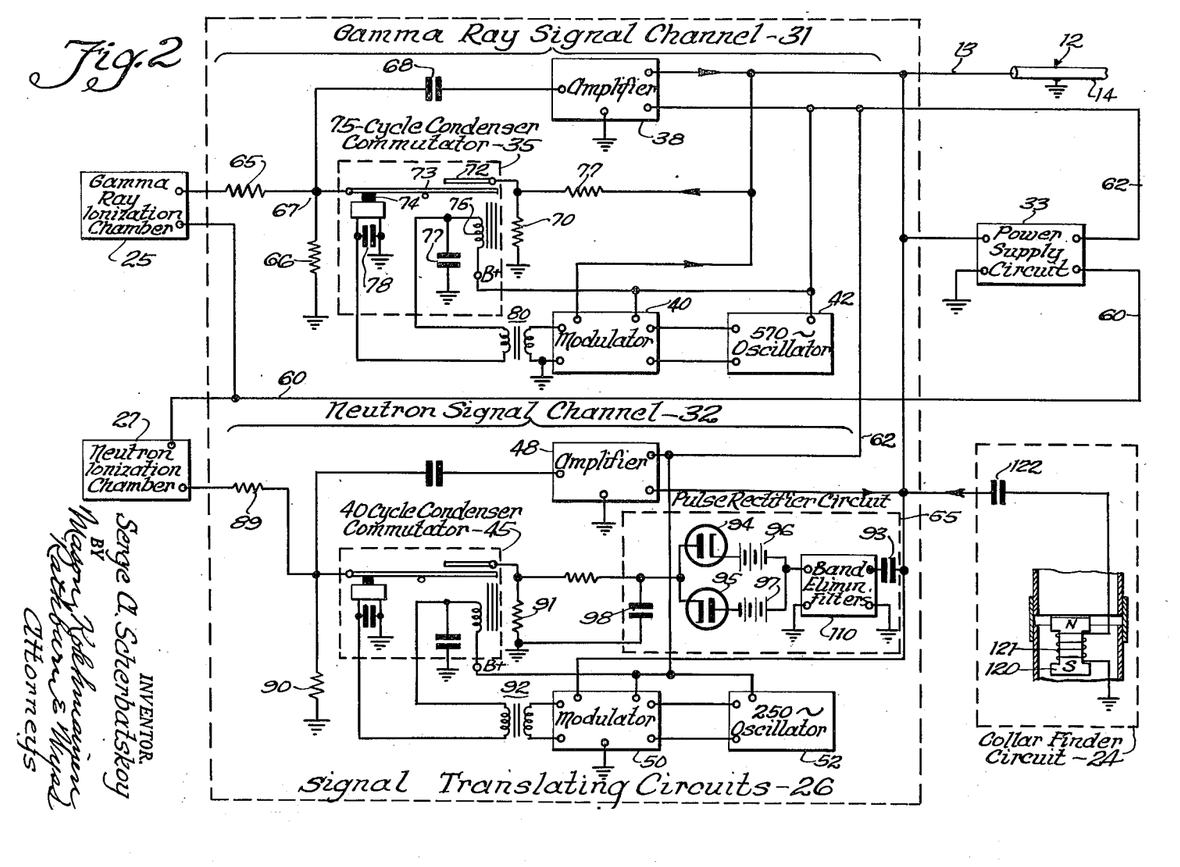
Fig. 2 is a schematic diagram of one embodiment of the subsurface equipment of the present improved logging apparatus.
Figure 3:
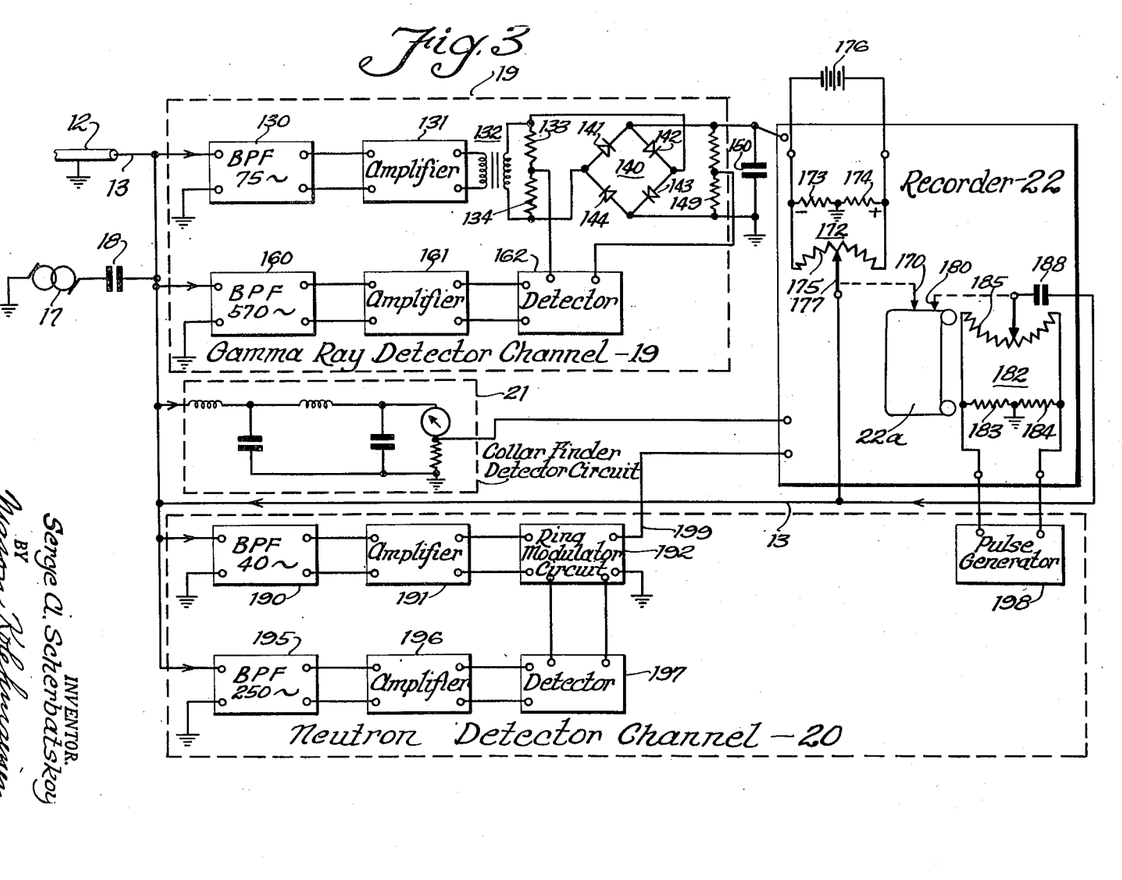
Fig. 3 is a schematic diagram of one embodiment of the surface equipment of the present improved logging apparatus.

Considering now the detailed circuit arrangement of the system shown in Figs. 2 and 3, and as discussed above in connection with the general system arrangement of Fig. 1, the subsurface unit 10 performs the functions of supplying correlated neutron, gamma ray and collar position signals over the conductor 13 to the surface equipment 11 as the subsurface unit 10 is moved longitudinally of the borehole. The power and signal translating circuits 26 of the subsurface unit 10 include the power supply circuit 33 (Fig. 2), the gamma ray signal channel 31 and the neutron signal channel 32. The gamma ray channel 31 includes a condenser-commutator indicated generally at 35, an amplifier 38, a modulator 40 and a 570 cycle oscillator 42. The neutron signal channel 32 is in many respects similar to the gamma ray signal channel 31 and includes a condenser commutator 45, an amplifier 48, a modulator 50, a 250 cycle oscillator 52 and a pulse rectifier circuit 55. The collar finder circuit 24 is also shown in detail in Fig. 2 of the drawings.

The power supply circuit 33 receives alternating current power from the generator 17 over the cable 12 and includes facilities for converting the same to a unidirectional supply voltage which is suitable for energizing the radiation detectors 25 and 27 and the circuit components of the gamma ray signal channel 31 and the neutron signal channel 32. While the power supply circuit 33 may be of any desired configuration, it is preferred to employ a power supply circuit of the type described and claimed in my above identified copending application Serial No. 205,616. While reference may be had to this application for a detailed description of the power supply circuit 33, for purposes of the present disclosure it may be stated that a 400 cycle power wave is supplied from the generator 17 to the power supply circuit 33, wherein a power transformer and rectifier circuit is provided to supply rectified and filtered high voltage to the ionization chambers 25 and 27 over the conductor 60 and to provide a relatively low, rectified and filtered anode potential which is supplied over the conductor 62 to the vacuum tubes of the gamma ray and neutron signal channels 31 and 32. Preferably, the power supply circuit includes means for preventing harmonics of the rectified voltage from appearing on the conductor 13 and furthermore provides a balanced type of operation whereby the output potentials of the power supply circuit 33 do not vary appreciably with large changes in ambient temperature, as described in detail in my copending application identified above.

Considering first the gamma ray logging portion of the system of Figs. 2 and 3, and more particularly the gamma ray signal channel 31, the electrodes of the gamma ray ionization chamber 25 are energized by the high voltage supplied thereto over the conductor 60 and there is produced across the series connected output resistors 65 and 66 thereof a unidirectional voltage which is proportional to the intensity of gamma ray radiation intercepted by the ionization chamber 25. In order to measure at the earth's surface the potential drop across the resistor 66, and hence to obtain an indication of the gamma ray intensity as the subsurface unit 10 is moved up and down within the borehole, a null balance or follow-up system is provided which includes the condenser commutator circuit 35, the amplifier 38, the modulator 40, the oscillator 42 and certain components of the surface equipment to be described in more detail hereinafter. More particularly, the condenser commutator circuit 35 is employed to measure the voltage difference between the voltage existing across the ionization chamber output resistor 66 and a feedback load resistor 70 and to convert this voltage difference into a so-called error signal having a frequency of 75 cycles per second. The condenser commutator 35 may be of the type described in detail in my prior Patent No. 2,349,225, and reference may be had to this patent for a detailed description of such a condenser commutator. However, for purposes of the present disclosure, it may be stated that the condenser commutator 35 includes a fixed commutator plate 72 which is electrically connected through the feedback load resistor 70 to ground and a movable commutator plate 73 which is electrically connected through the resistor 66 to ground. A carbon button 74 is contiguous to one end of the movable plate 73 and the plate 73 acts as an armature in a buzzer type circuit under the influence of a solenoid coil 75 which is energized from the power supply unit 33. The solenoid 75 is broadly tuned to resonance at a center frequency of 75 cycles per second by means of the condenser 77 which is connected from the solenoid 75 to ground. Likewise, a condenser 78 is connected across the carbon button 74 to reduce switching transients thereacross. The primary winding of a coupling transformer 80 is connected between the solenoid 75 and the carbon button 74.

The solenoid 75, current supply source 33, the primary winding of the coupling transformer 80 and the carbon button 74, are all in series circuit relation, so that as the carbon button is compressed by motion of the commutator plate 73 away from the solenoid 75, the current from the current supply source increases, thus tending to return the commutator plate 73 to its former position. As the plate 73 returns, the pressure on the carbon button is reduced, thereby reducing the current and lessening the pull on the solenoid on the movable plate 73. The frequency at which the movable plate 73 vibrates is determined in part by the mass and compliance of the movable plate 73 and, as stated above, in the illustrated embodiment the condenser commutator 35 is adjusted to operate at a frequency of 75 cycles per second.

As the movable plate 73 vibrates, the capacity between the plates 72 and 73 undergoes a cyclic variation and if the potentials across the resistors 66 and 70 are not equal, a 75 cycle voltage is produced at the terminal point 67, the amplitude of which is equal to the voltage difference between the ungrounded ends of the resistors 66 and 70 and the phase of which varies according to the relative polarities of the voltages across these resistors. Thus, if the potential across the resistor 66 is greater than the potential across the resistor 70, a positively phased 75 cycle error voltage is produced at the terminal point 67. On the other hand, if the voltage across the resistor 66 is less than the resistor 70, a 75 cycle error signal of the opposite phase is produced at the terminal 67.

In order to provide a fixed phase reference signal, so that the above described changes in phase of the 75 cycle error signal may be detected at the earth's surface, the 75 cycle energizing current, which flows through the solenoid 75 and is of fixed phase and amplitude, is coupled through the transformer 80 to the modulator 40. In the modulator 40 the 75 cycle reference signal is modulated upon a 570 cycle carrier wave derived from the oscillator 42. The modulator 40 and oscillator 42 may comprise any circuit arrangement which is suitable for superimposing the 75 cycle reference phase signal as a modulation component on a high frequency carrier wave. For example, the modulator 40 and oscillator 42 may be constructed as described in my prior Patent No. 2,349,225 wherein the oscillator 42 comprises a simple resonant circuit, which has a resonant frequency of 570 cycles per second, through which current pulses of short duration are passed at the peak of each cycle of the 75 cycle reference signal by means of a diode rectifier circuit. The current pulses excite a damped oscillatory wave train whose fundamental period is determined by the resonant frequency of the resonant circuit, i. e., 570 cycles per second, and which comprises a series of damped waves recurring at a rate of 75 cycles per second. Since the pulses of current determine the start of each damped wave train, the phase relationship of the 75 cycle modulation bears a fixed time relationship to the movements of the commutator plate 73. This modulation component constitutes a fixed phase reference signal which is transmitted over the conductor 13 to the surface equipment.

The 75 cycle error signal produced at the terminal 67 in the manner described above, is coupled through the condenser 68 to the amplifier 38 wherein the error signal is amplified to a suitable level and transmitted over the conductor 13 to the surface equipment. The amplifier 38 may comprise any suitable circuit arrangement for amplifying the 75 cycle error signal to the desired level. For example, an amplifier such as shown in my prior patent identified above, may be employed.

Considering now the embodiment of the surface equipment 11 shown in detail in Fig. 3 of the drawings, this equipment performs the functions of separating the signals which are transmitted thereto from the cable 12 and of simultaneously producing a continuous and permanent record of correlated gamma ray and neutron activity and collar position location in the borehole. Referring to this figure, signals which are supplied over the conductor 13 to the surface equipment 11, are coupled to the gamma ray detector channel 19, the neutron detector channel 20 and the collar finder detector circuit 21. The gama ray detector channel 19 of the surface equipment 11 comprises a 75 cycle band pass filter 130, an amplifier 131, a 570 cycle band pass filter 160, an amplifier 161, a detector 162 and a ring modulator circuit 140. The 75 cycle gamma ray error signal which is transmitted over the cable 12 to the surface, is separated from all of the remaining signals present on the cable conductor 13 in the band pass filter 130. The band pass filter 130 may comprise any suitable electric wave filter for separating the 75 cycle error signal from the remaining signals of the circuit. However, the filter 130 should have a sufficiently sharp cut-off characteristic to reject the adjacent 40 cycle neutron error signal.

The separated 75 cycle error signal is amplified by the amplifier 131 to a suitable level and coupled through the transformer 132 to the ring modulator circuit indicated generally at 140. The ring modulator circuit comprises a series of four rectifiers 141, 142, 143 and 144, all of which are connected in a series loop with the same polarity around the loop to provide a modified bridge circuit arrangement. A series circuit including the resistors 133 and 134 is connected across the secondary of the transformer 132 and the voltage across these resistors is supplied to one pair of diametrically opposed terminals of the modulator 140. A second series circuit including the resistors 148 and 149 is connected across the other pair of diametrically opposed terminals of the modulator 140 and a filter condenser 150 is connected across the resistors 148 and 149.

In order to separate the 570 cycle carrier wave on which is modulated the 75 cycle gamma ray reference signal from the other signals of the system, there is provided the band pass filter 160 which has a sufficiently sharp cut-off characteristic to reject the other signals present on the cable conductor 13. The 570 cycle modulated carrier wave is amplified by the amplifier 161 to a suitable level for detection in the detector 162. The detector 162 may comprise any suitable circuit arrangement for demodulating the carrier wave to provide a fixed phase 75 cycle reference signal. The 75 cycle reference signal produced by the detector 162 is applied to the junction point between the resistors 133 and 134 and to the junction point between the resistors 148 and 149.

If the 75 cycle reference signal is supplied to the modulator 140 and no 75 cycle error signal is supplied thereto from the amplifier 131, the modulator output is balanced so that no output voltage is produced across the condenser 150. However, if a 75 cycle error signal is present, a unidirectional voltage is produced across the condenser 150 which is proportional to the amplitude of the error signal. If the phase of the 75 cycle error signal changes, the ring modulator 140 produces a unidirectional output voltage of the opposite polarity and of an amplitude proportional to the amplitude of the error signal. The ring modulator 140 thus produces a unidirectional output voltage which is accurately representative of the voltage difference between the resistors 166 and 170 in the subsurface unit 10.

The unidirectional output voltage from the modulator 140 is connected to one pair of input terminals of the recorder 22. In the illustrated embodiment, the recorder 22 is of the dual type and includes a gamma ray recording pen 170 and a neutron recording pen 180. The recorder 22 is also provided with slide wire potentiometer circuits which are controlled in accordance with the respective gamma ray and neutron inputs to the recorder, and which may be energized by external potential sources. Thus, the recorder 22 is provided with a first slide wire potentiometer circuit 172 which includes the series connected resistors 173 and 174 and the slide wire potentiometer 175 which is connected across the resistors 173 and 174. The common junction of the resistors 173 and 174 is connected to ground, and a voltage from an external unidirectional potential source, indicated by the battery 176, is connected across the series connected resistors 173 and 174 and the shunt connected slide wire potentiometer 175 with the polarity shown in Fig. 3. As the position of the arm 177 of the potentiometer 175 is varied in accordance with the movement of the gamma ray recording pen 170, a variable unidirectional voltage is produced. For example, if the arm 177 is at exactly the mid point of the potentiometer 175, the potential of the arm 177 with respect to ground is zero. If the arm is moved to the right, a positive potential with respect to ground is produced and if the arm is moved to the left, a negative potential with respect to ground is produced.

The arm 177 of the slide wire potentiometer 175 is connected to the central conductor 13 of the cable 12 so that the voltage produced at the arm 177 is fed back over the cable 12 to the subsurface equipment 10. In the subsurface equipment 10 the unidirectional feedback potential is supplied through the resistor 71 to the resistor 70 in the gamma ray signal channel 31, so as to change the potential across the resistor 70 in the correct direction to balance the potential across the resistor 66 and thus balance the gamma ray system. If, now, the output current from the gamma ray detector 25 which flows through the resistor 66 increases, a positively phased 75 cycle error signal is produced at the terminal 67 which is amplified in the amplifier 38 and transmitted to the surface equipment 11, together with a fixed phase 75 cycle reference signal which is modulated on the 570 cycle carrier wave, to readjust the setting of the gamma ray slide wire potentiometer 175, and a unidirectional feedback current is fed back from the potentiometer 175 to the resistor 70 which balances the increased detector output current. The system is thus brought to a balance or null condition in which condition no potential difference exists between the commutator plates 72 and 73 and no 75 cycle error signal is transmitted over the conductor 13 to the surface equipment.

On the other hand, if the ionization current through the resistor 66 decreases, a negatively phased 75 cycle error signal is produced which is transmitted to the surface equipment to effect movement of the potentiometer 175 in the opposite direction and the unidirectional feedback current is correspondingly reduced by an amount such that the voltages across the resistors 66 and 70 are again equalized. From the foregoing discussion, it is evident that the above described follow-up system of measurement provides a means for transmitting information relative to the changes in the amplitude and polarity of the voltage across the resistor 66 while employing a single conductor cable.

Considering now the neutron signal channel 32 (Fig. 2), the neutron ionization chamber 27 produces a unidirectional ionization current which flows through the series connected output resistors 89 and 90 thereof. The condenser commutator circuit 45 is substantially identical with the condenser commutator 35 of the gamma ray signal channel 31, except for the fact that the condenser commutator 45 is designed to operate at a frequency of 40 cycles per second. The commutator 45 is used to develop a 40 cycle error signal which is proportional in amplitude and phase to the difference in voltage produced across the resistor 90 and a feedback load resistor 91. The 40 cycle error signal is amplified in the amplifier 48 and transmitted over the cable conductor 13 to the surface equipment. Also a 40 cycle reference signal is produced in the commutator circuit 45 which is coupled through the transformer 92 to the modulator 50 wherein it is superimposed upon a 250 cycle carrier wave produced by the 250 cycle oscillator 52. The modulator 50 and the oscillator 52 may comprise any desired circuit arrangement suitable for producing a 250 cycle carrier wave having the 40 cycle fixed phase reference signal superimposed thereon. For example, the modulator 50 and oscillator 52 may be substantially identical to the modulator 40 and oscillator 42 described in detail above in connection with the gamma ray signal channel 31. The 40 cycle reference signal which is superimposed upon the 250 cycle carrier wave is also transmitted over the conductor 13 to the surface equipment.

Considering now the neutron detector channel 29 in the surface equipment 11 (Fig. 3), this channel comprises a 40 cycle band pass filter 190, an amplifier 191, a 250 cycle band pass filter 195, an amplifier 196, a detector 197, a ring modulator circuit 192, and a pulse generator 198. The 40 cycle error signal which is produced by the neutron signal channel 32 in the manner described above, is transmitted over the cable 12 to the neutron detector channel 29 and is separated from the other signals present on the cable conductor 13 by the band pass filter 190. The band pass filter 190 may comprise any suitable circuit arrangement for separating the 40 cycle error signal and preferably has a sufficiently sharp cut-off characteristic to reject the adjacent 75 cycle error signal associated with the gamma ray signal channel 31. The 40 cycle error signal is amplified by the amplifier 191 to a suitable level and is supplied to the ring modulator circuit 192. In circuit configuration, the ring modulator circuit 192 is identical with the ring modulator circuit 140 described in detail above in connection with the gamma ray detector channel 19.

The 40 cycle phase reference signal which is modulated on the 250 cycle carrier wave is also separated from the other signals present on the cable conductor 13 by the band pass filter 195 which has a center pass frequency of 250 cycles. The separated 250 cycle modulated carrier wave is then amplified in the amplifier 196 and supplied to the detector 197 wherein the carrier wave is demodulated to provide a 40 cycle phase reference signal which is supplied to the ring modulator circuit 192. The ring modulator circuit 192 functions in the same manner as the modulator 140 to produce a unidirectional control voltage which is accurately representative of the voltage difference between the resistors 90 and 91 in the neutron signal channel 32. This unidirectional control voltage is supplied over the conductor 199 to one of the input circuits of the dual recorder 22 and is used to control the position of the neutron recording pen 180.

Figure 7:
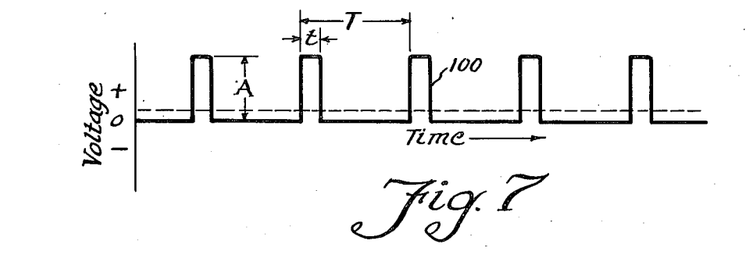
Fig. 7 is a timing diagram used in explaining the operation of the system of Figs. 2 and 3.

In order to provide a feedback potential for the neutron channel which can be applied to the feedback load resistor 91 to balance the potential across the resistor 90, while not conflicting with the unidirectional feedback potential which is fed over the conductor 13 to the gamma ray signal channel 31 in the manner described above, a pulse type of feedback signal is derived from the pulse generator 198. More specifically, the pulse generator 198 produces pulses having substantially the wave form shown in Fig. 7. As there shown, the pulses 100 have a time duration "t" which is a small fraction of the total period "T" between pulses. Furthermore, the repetition rate of the pulse is relatively high, preferably in the order of 1,000 to 2,000 cycles per second. The output from the pulse generator 198 is supplied to a neutron slide wire potentiometer circuit indicated generally at 182 in Fig. 3. The circuit 182 includes the series connected resistors 183 and 184 which are connected across a neutron slide wire potentiometer 185. The pulse generator 198 is connected across the potentiometer 185 and the junction point of the resistors 183 and 184 is connected to ground so that there is produced between the arm 187 of the potentiometer 185 and ground the pulses 100 having an amplitude A (Fig. 7) which varies in accordance with the position of the arm 187. The feedback pulses produced at the arm of the potentiometer 185 are coupled through the condenser 188 to the cable conductor 13 and fed back to the subsurface unit 10.

In the subsurface equipment 10, the feedback pulses are applied to a pulse rectifier circuit 55 (Fig. 2) and are coupled through the condenser 93 to the diode rectifiers 94 and 95 through the series connected bias potential sources 96 and 97. The condenser 93 blocks all of the unidirectional signals present on the conductor 13. If desired band elimination filters, indicated generally at 110, may be provided ahead of the pulse rectifier circuit 55 to suppress the low frequency error signals and the carrier frequency waves transmitted over the conductor 13 to the surface equipment 11 in the manner described above.

The rectifier and bias voltage combinations act as threshold devices to eliminate any oversnoot which may occur at the trailing edges of the feedback pulses 100 due to charging of the condenser 93 during the interval of the pulses. Also, the rectifiers 94 and 95 rectify the feedback pulses to produce across the output condenser 98 of the rectifier circuit 55, a unidirectional feedback voltage which in amplitude is proportional to the amplitude of the feedback pulses 100 and has a polarity which corresponds to the polarity of these pulses. The potential across the condenser 98 produces a flow of current through the feedback load resistor 91 which balances the potential across the resistor 90 so that the system is brought to an accurate balance. If the unidirectional current which flows through the resistor 90 varies in either direction, a 40 cycle error signal is produced by the condenser commutator circuit 45 in the manner described above. This signal is fed to the surface equipment to effect readjustment of the potentiometer 185 and feedback pulses of corresponding amplitude and polarity are fed back over the conductor 13 to the pulse rectifier circuit 55, wherein they are rectified to produce a corresponding unidirectional feedback current flow through the resistor 91, thereby to balance the system.

It will thus be evident that the neutron signal transmission facilities include a feedback system wherein feedback pulses proportional in amplitude and polarity to the position of the neutron recording pen 180 are derived from the generator 198, transmitted over the cable 12, and rectified to produce a unidirectional feedback potential which is used to balance the system.

The collar finder circuit 24 may comprise any suitable circuit arrangement for producing unidirectional voltage fluctuations in response to the traversal of casing collars by the subsurface unit 10. In the embodiment illustrated in Fig. 2, the collar finder circuit 24 comprises a simple permanent magnet 120 upon which is wound a coil 121 which is connected at one end through the condenser 122 to the conductor 13 and at the other end to ground. Whenever the magnet 120 passes a casing collar, the reluctance of the magnetic circuit is altered and a unidirectional voltage kick or fluctuation is generated which is coupled through the condenser 122 to the conductor 13 and transmitted to the earth's surface. In the surface equipment the unidirectional voltage kicks are filtered in the collar finder detector circuit 21 and impressed upon the recorder 22, thereby to produce correlated collar position information on the record chart 22a.

Simultaneous gamma ray and neutron logging may also be accomplished by means of the alternative embodiment of the invention shown in detail in Figs. 4 and 5. Referring to these figures, the gamma ray signal channel 31 (Fig. 4) and the gamma ray detector channel 19 (Fig. 5) are indentical with the corresponding units shown in Figs. 2 and 3 and function to provide a continuous log of the gamma ray activity by movement of the recording pen 170. The neutron signal channel 32 and the neutron detector channel 20 of Figs. 4 and 5 also are the same in many respects as the corresponding units of the system shown in Figs. 2 and 3. However, in the neutron channel of Figs. 4 and 5, the feedback voltage is in the form of a sine wave which is fed back to the subsurface unit 10 along with a fixed phase reference signal, which is modulated on a carrier wave of different frequency.

More specifically, in the alternative system of Figs. 4 and 5, the slide wire potentiometer 182 (Fig. 5) is energized by means of an 800 cycle sine wave oscillator 200. Accordingly, an 800 cycle feedback signal is produced at the arm 187 of the slide wire potentiometer 185 which varies in amplitude and phase in accordance with the position of the recording pen 180. The 800 cycle feedback signal is coupled through the condenser 188 to the cable 12 and transmitted back to the subsurface unit 10.

In order to provide an 800 cycle fixed phase reference signal which may be used as a standard for comparison with the 800 cycle feedback signal, the output of the oscillator 200 is modulated on a high frequency carrier wave having a frequency of the order of 4500 cycles per second. Thus, a 4500 cycle oscillator 202 is provided and the outputs of the oscillators 200 and 202 are supplied to a modulator 204 so as to provide in the output circuit thereof a 4500 cycle carrier wave which is modulated with the 800 cycle fixed phase reference signal. The output from the modulator 204 is connected to the cable conductor 13 and transmits the modulated carrier wave to the subsurface equipment 10. In the subsurface equipment 10, the neutron signal channel 32 (Fig. 4) includes a band pass filter 210 which separates the 800 cycle feedback signal from the other signals present on the cable conductor 13 and supplies the separated 800 cycle feedback signal through the coupling transformer 212 to a ring modulator circuit 220. The neutron signal channel 32 also includes a band pass filter 215 which separates the 4500 cycle modulated carrier wave from the other signals of the system and supplies the separated carrier wave through the coupling transformer 214 to the detector 218. The detector 218 demodulates the separated 4500 cycle signal so as to provide an 800 cycle phase reference signal which is also supplied to the ring modulator circuit 220. The ring modulator circuit 220 functions in a manner identical to the ring modulator circuit 140 described in detail in connection with the gamma ray detector channel 19 (Fig. 3) and provides a unidirectional feedback voltage which is supplied to the feedback load resistor 91 to complete the feedback loop of the system.

Figure 6:
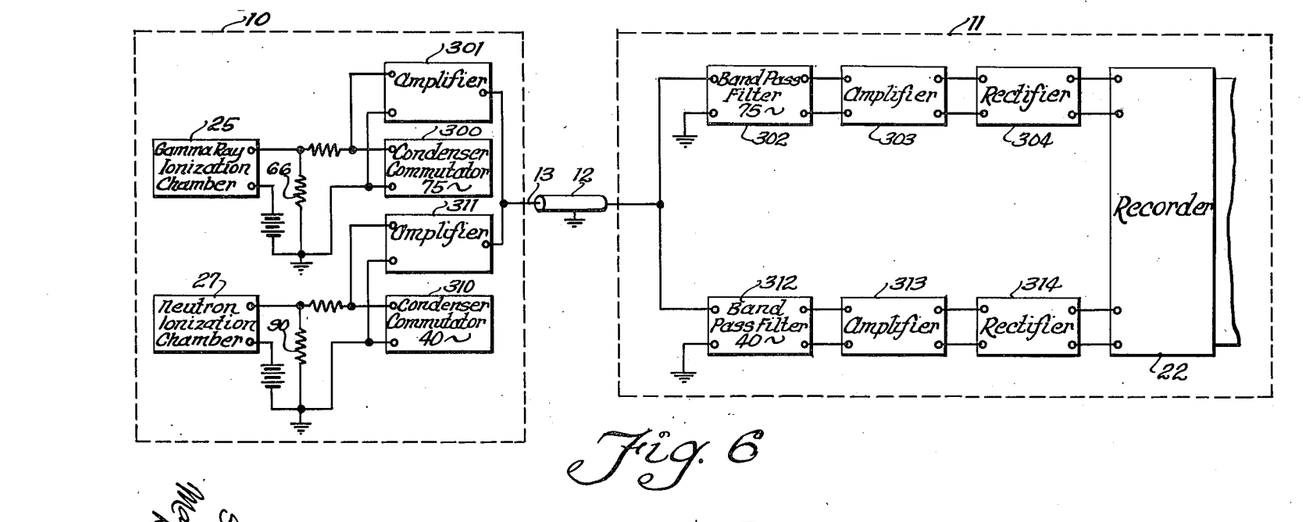
Fig. 6 diagrammatically illustrates an alternative simultaneous radioactivity well logging system of the present invention.

In the event it is desired to provide a simplified system for simultaneously obtaining a neutron and gamma ray log, the system of Fig. 6 may be employed. In this system, the output from the gamma ray ionization chamber 25 and the neutron ionization chamber 27 are translated into alternating current signals by means of the condenser commutators 309 and 310, which are substantially identical with the condenser commutators 35 and 45 described in detail in connection with the system of Figs. 2 and 3. However, in order to simplify the system, the stationary plates 72 (Fig. 2) of these commutators are connected directly to ground and no feedback system is employed. The ionization current of the gamma ray ionization chamber 25 is converted into a 75 cycle signal which is amplified in the amplifier 301 and transmitted over the cable 12 to the surface equipment 11. At the surface, the 75 cycle signal is separated from the other signals of the system in the band pass filter 302, amplified in the amplifier 303, and rectified in the rectifier 304 to produce a unidirectional output voltage corresponding to the ionization current flowing through the resistor 66. The unidirectional output voltage is then supplied to one input circuit of the recorder 22.

In an entirely identical manner, the neutron ionization current is converted into a 40 cycle signal by means of the commutator 310, amplified in the amplifier 311, transmitted over the cable 12 to the surface equipment 11, separated from the other signals of the system in the band pass filter 312, amplified in the amplifier 313 and detected in the rectifier 314 to provide a unidirectional output voltage which is supplied to the other input circuit of the recorder 22. In this connection it will be understood that a collar finder circuit 24 and power supply 33 (Fig. 2) and a collar finder detector circuit 21 (Fig. 3) may be employed in the system of Fig. 6 to supply power to the subsurface unit 10 and to provide correlated collar position information in the manner described in detail in connection with the systems of Figs. 2–5, inclusive.

While the alternative systems of the present invention have been described with reference to specific error and feedback signal frequencies, it will be understood that these frequencies are given merely for illustrative purposes and may vary from the values specified by a considerable amount. Thus, if desired, the frequency of the condenser commutators may be chosen in harmonic relation to the carrier oscillators, as described in the prior patent identified above.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. A radioactivity well logging system, comprising a subsurface unit, a cable having at least one insulated conductor for lowering said unit into a borehole, a first radiation detector included in said unit and adapted to produce a first signal in response to first radiations incoming to said unit, a second radiation detector included in said unit and adapted to produce a second signal in response to second radiations incoming to said unit, and means including two mutually non-interfering self-balancing follow-up systems for transmitting over a conductor of said cable information representative of said first and second signals and for simultaneously logging at the earth's surface the activity of said first and second radiations in the borehole.

2. A radioactivity well logging system, comprising a subsurface unit, a cable having at least one insulated conductor for lowering said unit into a borehole, a first radiation detector included in said unit and adapted to produce a first signal in response to gamma ray radiations intercepted thereby, a second radiation detector included in said unit and adapted to produce a second signal in response to neutrons intercepted thereby, two mutually non-interfering self-balancing follow-up systems commonly including a conductor of said cable for transmitting said signals to the earth's surface, and means at the earth's surface controlled in accordance with the operation of said follow-up systems for simultaneously logging the gamma ray and neutron activity in said borehole.

3. A radioactivity well logging system, comprising a subsurface unit, a single conductor cable for lowering said unit into a borehole, a first radiation detector included in said unit and adapted to produce a first signal in response to first incoming radiations, a second radiation detector included in said unit and adapted to produce a second signal in response to second incoming radiations, collar finder means included in said unit and operative to produce direct current fluctuations in response to traversal of casing collars by said unit, means including two mutually non-interfering self-balancing follow-up systems for transmitting over the single conductor of said cable information representative of said first and second signals and said direct current fluctuations and for simultaneously logging at the earth's surface the activity of both said first and second radiations in the borehole and the casing collars traversed by said unit.

4. A radioactivity well logging system, comprising a subsurface unit, a single conductor cable for lowering said unit into a borehole, a first ionization chamber included in said unit and operative to produce a first unidirectional current in response to first incoming radiations, a second ionization chamber included in said unit and operative to produce a second unidirectional current in response to second incoming radiations, recording means at the earth's surface, and two mutually non-interfering follow-up systems commonly including the single conductor of said cable for controlling said recording means in accordance with said first and second unidirectional currents, thereby simultaneously to produce continuing indications of the variations of said first and second radiations within the borehole.

5. In a simultaneous radioactivity well logging system of the type employing a subsurface unit adapted to produce a first unidirectional current proportional to first incoming radiations and a second unidirectional current proportional to second incoming radiations, the method of measuring at the earth's surface both said unidirectional currents while utilizing a single conductor supporting cable for the subsurface unit, which comprises the steps of translating said unidirection currents into alternating currents of different frequencies, transmitting said alternating currents over the single conductor of said cable to the earth's surface, separting said alternating currents from each other at the earth's surface, and producing a continuous graph of said separated signals, thereby to provide correlated logs of said first and second radiations.

6. In a simultaneous radioactivity well logging system of the type employing a subsurface unit adapted to be lowered into a borehole by means of a single conductor cable and providing a first unidirectional current representative of first incoming radiations, and a second unidirectional current representative of second incoming radiations, the method of measuring at the earth's surface both said unidirectional currents which comprises the steps of, converting by means of condenser commutators said unidirectional currents into alternating currents of different frequencies, transmitting said alternating currents of different frequencies over the single conductor of said cable to the earth's surface, separating said alternating currents from each other at the earth's surface, rectifying each of said separated currents, and producing a continuous graph of said rectified currents, thereby simultaneously to provide correlated logs of said first and second radiations.

7. In a simultaneous neutron and gamma ray well logging system of the type employing a subsurface unit adapted to be lowered into a borehole by means of a single conductor cable and providing a first unidirectional current representative of gamma radiation intercepted by the unit and a second unidirectional current representative of neutrons intercepted by the unit, the method of simultaneously measuring both said unidirectional currents at the earth's surface which comprises the steps of, transmitting a first alternating current error signal of given frequency and indicative of changes in said first unidirectional current together with a fixed phase reference signal of the same frequency over the single conductor of said cable to the earth's surface, feeding back over the single conductor of said cable a unidirectional voltage to balance changes in said first unidirectional current and reduce said error signal to zero, transmitting a second alternating current error signal of different frequency and indicative of changes in said second unidirectional current together with a fixed phase reference signal of the same frequency over the single conductor of said cable to the earth's surface, and feeding back over the single conductor of said cable a feedback wave representative of the amplitude and phase of said second error signal, thereby to balance changes in said second unidirectional current and reduce said second error signal to zero.

8. In a simultaneous radioactivity well logging system of the type employing a subsurface unit adapted to be lowered into a borehole by means of a single conductor cable and providing a first unidirectional current representative of first incoming radiations and a second unidirectional current representative of second incoming radiations, the method of simultaneously measuring both said unidirectional currents at the earth's surface which comprises the steps of, transmitting a first alternating current error signal of given frequency and indicative of changes in said first unidirectional current together with a fixed phase reference signal of the same frequency over the single conductor of said cable to the earth's surface, feeding back over the single conductor of said cable a unidirectional voltage to balance changes in said first unidirectional current and reduce said error signal to zero, transmitting a second alternating current error signal of different frequency and indicative of changes in said second unidirectional current together with a fixed phase reference signal of the same frequency over the single conductor of said cable to the earth's surface, and feeding back over the single conductor of said cable a pulse wave having an amplitude and polarity corresponding to the amplitude and phase of said second error signal, thereby to balance changes in said second unidirectional current and reduce said second error signal to zero.

9. In a simultaneous radioactivity well logging system of the type employing a subsurface unit adapted to be lowered into a borehole by means of a single conductor cable and providing a first unidirectional current representative of first incoming radiations and a second unidirectional current representative of second incoming radiations, the method of simultaneously measuring both said unidirectional currents at the earth's surface which comprises the steps of, transmitting a first alternating current error signal of given frequency and indicative of changes in said first unidirectional current together with a fixed phase reference signal of the same frequency over the single conductor of said cable to the earth's surface, adjusting a first slide wire potentiometer in accordance with said first error signal, feeding back over the single conductor of said cable a unidirectional voltage proportional to the adjusted position of said potentiometer thereby to balance changes in said first unidirectional current and reduce said first error signal to zero, transmitting a second alternating current error signal of different frequency and indicative of changes in said second unidirectional current, together with a fixed phase reference signal of the same frequency over the single conductor of said cable to the earth's surface, adjusting a second slide wire potentiometer in accordance with said second error signal, and feeding back over the single conductor of said cable a pulse wave having an amplitude and polarity corresponding to the adjusted position of said second potentiometer, thereby to balance changes in said second unidirectional current and reduce said second error signal to zero.

10. In a simultaneous radioactivity well logging system of the type employing a subsurface unit adapted to be lowered into a borehole by means of a single conductor cable and providing a first unidirectional current representative of first incoming radiations and a second unidirectional current representative of second incoming radiations, the method of simultaneously measuring both said unidirectional currents at the earth's surface which comprises the steps of, transmitting a first alternating current error signal of given frequency and indicative of changes in said first unidirectional current together with a fixed phase reference signal of the same frequency over the single conductor of said cable to the earth's surface, adjusting a first slide wire potentiometer in accordance with said first error signal, feeding back over the single conductor of said cable a unidirectional voltage proportional to the adjusted position of said potentiometer thereby to balance changes in said first unidirectional current and reduce said first error signal to zero, transmitting a second alternating current error signal of different frequency and indicative of changes in said second unidirectional current, together with a fixed phase reference signal of the same frequency over the single conductor of said cable to the earth's surface, adjusting a second slide wire potentiometer in accordance with said second error signal, feeding back over the single conductor of said cable a pulse wave having an amplitude and polarity corresponding to the adjusted position of said second potentiometer, and rectifying said feedback pulse wave to produce a unidirectional potential for balancing changes in said second unidirectional current, thereby to reduce said second error signal to zero.

11. In a simultaneous radioactivity well logging system of the type employing a subsurface unit adapted to be lowered into a borehole by means of a single conductor cable and providing a first unidirectional current representative of first incoming radiations and a second unidirectional current representative of second incoming radiations, the method of simultaneously measuring both said unidirectional currents at the earth's surface which comprises the steps of, transmitting a first alternating current error signal of given frequency and indicative of changes in said first unidirectional current together with a fixed phase reference signal of the same frequency over the single conductor of said cable to the earth's surface, adjusting a first slide wire potentiometer in accordance with said first error signal, feeding back over the single conductor of said cable a unidirectional voltage proportional to the adjusted position of said potentiometer thereby to balance changes in said first unidirectional current and reduce said first error signal to zero, transmitting a second alternating current error signal of different frequency and indicative of changes in said second unidirectional current, together with a fixed phase reference signal of the same frequency over the single conductor of said cable to the earth's surface, adjusting a second slide wire potentiometer in accordance with said second error signal, feeding back over the single conductor of said cable an alternating current signal having an amplitude and phase corresponding to the adjusted position of said second potentiometer and of a frequency different from the other signals of the system together with a fixed phase reference signal of the same frequency, and deriving in said unit a unidirectional potential proportional to said alternating current signal for balancing changes in said second unidirectional current, thereby to reduce said second error signal to zero.

12. In a simultaneous radioactivity well logging system of the type employing a subsurface unit adapted to be lowered into a borehole by means of a single conductor cable and providing a first unidirectional current representative of first incoming radiations and a second unidirectional current representative of second incoming radiations, the method of simultaneously measuring both said unidirectional currents at the earth's surface which comprises the steps of, transmitting a first alternating current error signal of given frequency and indicative of changes in said first unidirectional current together with a first fixed phase reference signal of the same frequency over the single conductor cable to the earth's surface, said first fixed phase reference signal being modulated on a first carrier wave of given frequency, feeding back over the single conductor of said cable a unidirectional voltage to balance changes in said first unidirectional current and reduce said error signal to zero, transmitting a second alternating current error signal of different frequency and indicative of changes in said second unidirectional current together with a second fixed phase reference signal of the same frequency over the single conductor of said cable to the earth's surface, said second fixed phase reference signal being modulated on a second carrier wave of different frequency, feeding back over the single conductor of said cable a pulse wave having an amplitude and polarity corresponding to the amplitude and phase of said error signal, thereby to balance changes in said second unidirectional current and reduce said second error signal to zero.

13. In a simultaneous radioactivity well logging system of the type employing a subsurface unit adapted to be lowered into a borehole by means of a single conductor cable and providing a first unidirectional current representative of first incoming radiations and a second unidirectional current representative of second incoming radiations, the method of simultaneously measuring both said unidirectional currents at the earth's surface comprising the steps of, transmitting a first alternating current error signal of given frequency and indicative of changes in said first unidirectional current together with a first fixed phase reference signal of the same frequency over the single conductor of said cable to the earth's surface, said first fixed phase reference signal being modulated on a first carrier wave of given frequency, adjusting a first slide wire potentiometer in accordance with said first error signal, feeding back over the single conductor of said cable a unidirectional voltage proportional to the adjusted position of said potentiometer thereby to balance changes in said first unidirectional current and reduce said first error signal to zero, transmitting a second alternating current error signal of different frequency and indicative of changes in said second unidirectional current, together with a second fixed phase reference signal of the same frequency over the single conductor of said cable to the earth's surface, said second fixed phase reference signal being modulated on a second carrier wave of different frequency, adjusting a second slide wire potentiometer in accordance with said second error signal, and feeding back over the single conductor of said cable an alternating current signal having an amplitude and phase corresponding to the adjusted position of said second potentiometer and of a frequency different from the other signals of the system together with a third fixed phase reference signal of the same frequency, said third fixed phase reference signal being modulated on a third carrier wave of a frequency different from said other carrier waves, deriving in said unit a unidirectional potential having an amplitude and polarity corresponding to the amplitude and phase of said feedback alternating current signal for balancing changes in said second unidirectional current, thereby to reduce said second error signal to zero.

14. A radioactivity well logging system comprising a subsurface unit, a single conductor cable for lowering said unit into a borehole, a first ionization chamber included in said unit and adapted to produce a first unidirectional current in response to first incoming radiations, a second ionization chamber included in said unit and adapted to produce a second unidirectional current in response to second incoming radiations, means included in said unit for translating each of said unidirectional currents into alternating currents of different frequencies, means including the single conductor of said cable for transmitting said alternating currents to the earth's surface, and means at the earth's surface and responsive to said alternating currents for logging the activity of said first and second radiations in the borehole.

15. A radioactivity well logging system comprising a subsurface unit, a single conductor cable for lowering said unit into a borehole, a first ionization chamber included in said unit and adapted to produce a first unidirectional current in response to gamma radiation intercepted thereby, a second ionization chamber included in said unit and operative to produce a second unidirectional current in response to neutrons intercepted thereby, means included in said unit for translating said unidirectional currents into alternating currents of different frequencies, means including the single conductor of said cable for transmitting said alternating currents to the earth's surface, means at the earth's surface for separating said alternating currents from each other, and means responsive to said separated currents for logging the neutron and gamma ray activity in the borehole.

16. A radioactivity well logging system comprising a subsurface unit, a single conductor cable for lowering said unit into a borehole, a first ionization chamber included in said unit and adapted to produce a first unidirectional current in response to first incoming radiations, a second ionization chamber included in said unit and operative to produce a second unidirectional current in response to second incoming radiations, means included in said unit for translating said unidirectional currents into alternating currents of different frequencies, collar finder means included in said unit and operative to produce direct current fluctuations in response to traversal of casing collars by said unit, means including the single conductor of said cable for transmitting said alternating currents and said direct current fluctuations to the earth's surface, and means at the earth's surface and responsive to said alternating currents and said direct current fluctuations for simultaneously producing continuing indications of the activity of said first and second radiations in the borehole and the casing collars traversed by said unit.

17. A radioactivity well logging system, comprising a subsurface unit, a single conductor cable for lowering said unit into a borehole, a first ionization chamber included in said unit and adapted to produce a first unidirectional current in response to first incoming radiations, a second ionization chamber included in said unit and adapted to produce a second unidirectional current in response to second incoming radiations, means included in said unit for translating each of said unidirectional currents into first and second alternating currents of different frequencies, means included in said unit for producing reference signals corresponding to each of said alternating currents, means including the single conductor of said cable for transmitting said alternating currents and said reference signals to the earth's surface, means at the earth's surface for comparing said first alternating current and the corresponding reference signal to obtain a first unidirectional control voltage, means at the earth's surface for moving the arm of a first slide wire potentiometer in accordance with said first control voltage, means for deriving a unidirectional feedback voltage corresponding to the adjusted position of said first potentiometer, means at the earth's surface for comparing said second alternating current and the corresponding reference signal to obtain a second unidirectional control voltage, means for moving the arm of a second slide wire potentiometer in accordance with said second control voltage, means for deriving a periodic feedback wave corresponding to the adjusted position of said second potentiometer, means including the single conductor of said cable for transmitting said feedback voltage and said feedback wave to said subsurface unit, and means at the earth's surface responsive to said control voltages for logging the activity of said first and second radiations in the borehole.

18. A radioactivity well logging system, comprising a subsurface unit, a single conductor cable for lowering said unit into a borehole, a first ionization chamber included in said unit and adapted to produce a first unidirectional current in response to first incoming radiations, a second ionization chamber included in said unit and adapted to produce a second unidirectional current in response to second incoming radiations, means included in said unit for translating each of said unidirectional currents into first and second alternating currents of different frequencies, means included in said unit for producing reference signals corresponding to each of said alternating currents, means including the single conductor of said cable for transmitting said alternating currents and said reference signals to the earth's surface, means at the earth's surface for comparing said first alternating current and the corresponding reference signal to obtain a first unidirectional control voltage, means at the earth's surface for moving the arm of a first slide wire potentiometer in accordance with said first control voltage, means for deriving a unidirectional feedback voltage corresponding to the adjusted position of said first potentiometer, means at the earth's surface for comparing said second alternating current and the corresponding reference signal to obtain a second unidirectional control voltage, means for moving the arm of a second slide wire potentiometer in accordance with said second control voltage, means for deriving a periodic feedback wave corresponding to the adjusted position of said second potentiometer, means including the single conductor of said cable for transmitting said feedback voltage and said feedback wave to said subsurface unit, means responsive to said feedback voltage and said feedback wave for counteracting said first and second unidirectional currents, and means at the earth's surface responsive to said control voltages for logging the activity of said first and second radiations in the borehole.

19. A radioactivity well logging system, comprising a subsurface unit, a single conductor cable for lowering said unit into a borehole, a first ionization chamber included in said unit and adapted to produce a first unidirectional current in response to first incoming radiations, a second ionization chamber included in said unit and adapted to produce a second unidirectional current in response to second incoming radiations, means included in said unit for translating each of said unidirectional currents into first and second alternating currents of different frequencies, means included in said unit for producing reference signals corresponding to each of said alternating currents, collar finder means included in said unit and operative to produce direct current fluctuations in response to traversal of casing collars by said unit, means including the single conductor of said cable for transmitting said alternating currents, said direct current fluctuations and said reference signals to the earth's surface, means at the earth's surface for comparing said first alternating current and the corresponding reference signal to obtain a first unidirectional control voltage, means at the earth's surface for moving the arm of a first slide wire potentiometer in accordance with said first control voltage, means for deriving a unidirectional feedback voltage corresponding to the adjusted position of said first potentiometer, means at the earth's surface for comparing said second alternating current and the corresponding reference signal to obtain a second unidirectional control voltage, means for moving the arm of a second slide wire potentiometer in accordance with said second control voltage, means for deriving a periodic feedback wave proportional in amplitude and polarity to the adjusted position of said second potentiometer, means including the single conductor of said cable for transmitting said feedback voltage and said feedback wave to said subsurface unit, and means at the earth's surface and responsive to said control voltages and said direct current fluctuations for simultaneously producing continuing indications of the activity of said first and second radiations in the borehole and casing collar position.

20. A radioactivity well logging system, comprising a subsurface unit, a single conductor cable for lowering said unit into a borehole, a first ionization chamber included in said unit and adapted to produce a first unidirectional current in response to first incoming radiations, a second ionization chamber included in said unit and adapted to produce a second unidirectional current in response to second incoming radiations, means included in said unit for producing a first alternating current error signal of given frequency indicative of changes in said first unidirectional current and for producing a first fixed phase reference signal of the same frequency, means included in said unit for producing a second alternating current error signal of different frequency indicative of changes in said second unidirectional current and for producing a second fixed phase reference signal of the same frequency, means including the single conductor of said cable for transmitting said signals to the earth's surface, means at the earth's surface for comparing said first error signal and said first reference signal to obtain a first unidirectional control voltage, means at the earth's surface for comparing said second error signal and said second reference signal to obtain a second unidirectional control voltage, first slide wire potentiometer recording means adjustable by means of said first control voltage, second slide wire potentiometer recording means adjustable by means of said second control voltage, means for deriving from said first potentiometer a unidirectional feedback potential proportional in amplitude and polarity to the adjusted position of said first potentiometer, means for deriving from said second potentiometer a feedback pulse wave having an amplitude and polarity corresponding to the adjusted position of said second potentiometer, means including the single conductor of said cable for feeding back said feedback potential and said feedback wave to said subsurface unit, and means included in said unit and responsive to said feedback potential and said feedback wave for reducing said first and second error signals to zero.

21. A radioactivity well logging system, comprising a subsurface unit, a single conductor cable for lowering said unit into a borehole, a first ionization chamber included in said unit and adapted to produce a first unidirectional current in response to first incoming radiations, a second ionization chamber included in said unit and adapted to produce a second unidirectional current in response to second incoming radiations, means included in said unit for producing a first alternating current error signal of given frequency indicative of changes in said first unidirectional current and for producing a first fixed phase reference signal of the same frequency, means included in said unit for producing a second alternating current error signal of different frequency indicative of changes in said second unidirectional current and for producing a second fixed phase reference signal of the same frequency, collar finder means included in said unit and operative to produce direct current fluctuations in response to traversal of casing collars by said unit, means including the single conductor of said cable for transmitting said signals and said direct current fluctuations to the earth's surface, means at the earth's surface for comparing said first error signal and said first reference signal to obtain a first unidirectional control voltage, means at the earth's surface for comparing said second error signal and said second reference signal to obtain a second unidirectional control voltage, first slide wire potentiometer means adjustable by means of said first control voltage, second slide wire potentiometer means adjustable by means of said second control voltage, means for deriving from said first potentiometer a unidirectional feedback potential proportional in amplitude and polarity to the adjusted position of said first potentiometer, means for deriving from said second potentiometer a feedback pulse wave having an amplitude and polarity corresponding to the adjusted position of said second potentiometer, means including the single conductor of said cable for feeding back said feedback potential and said feedback wave to said subsurface unit, means included in said unit and responsive to said feedback potential and said feedback wave for reducing said first and second error signals to zero, and means at the earth's surface and responsive to said control voltages and said direct current fluctuations for simultaneously producing continuing indications of the activity of said first and second radiations in the borehole and the position of traversed casing collars.

SERGE A. SCHERBATSKOY.

References Cited in the file of this patent

UNITED STATES PATENTS

| Number | Name | Date |
|---|---|---|
| 2,469,463 | Russell | May 10, 1949 |
| 2,481,014 | Herzog | Sept. 6, 1949 |
| 2,504,888 | Siegert | Apr. 18, 1950 |
| 2,558,427 | Fagan | June 26, 1951 |